(12) United States Patent  
Gunderson

(10) Patent No.: US 8,358,109 B2
(45) Date of Patent: Jan. 22, 2013

(54) RELIABLE EXTENDED USE OF A CAPACITOR FOR BACKUP POWER

(75) Inventor: Neal Frank Gunderson, Lake Elmo, MN (US)

(73) Assignee: Seagate Technology LLC, Cupertino, CA (US)

( * ) Notice: Subject to any disclaimer, the term of this patent is extended or adjusted under 35 U.S.C. 154(b) by 310 days.

(21) Appl. No.: 12/764,586

(22) Filed: Apr. 21, 2010

(65) Prior Publication Data
US 2011/0260695 A1  Oct. 27, 2011

(51) Int. Cl.
*H02J 7/00* (2006.01)

(52) U.S. Cl. ........................................ 320/166
(58) Field of Classification Search ............ 320/166
See application file for complete search history.

(56) References Cited

U.S. PATENT DOCUMENTS

| | | | |
|---|---|---|---|
| 4,874,960 A | 10/1989 | Cybela | |
| 5,057,385 A | 10/1991 | Hope et al. | |
| 5,568,341 A | 10/1996 | Shikano | |
| 5,596,708 A | 1/1997 | Weber | |
| 6,525,899 B2 | 2/2003 | Hearn et al. | |
| 6,847,192 B2 | 1/2005 | Turner et al. | |
| 7,186,478 B2 | 3/2007 | Forlino et al. | |
| 7,218,473 B2 | 5/2007 | Bernett et al. | |
| 7,487,391 B2 | 2/2009 | Pecone et al. | |
| 2003/0169022 A1* | 9/2003 | Turner et al. | 320/166 |
| 2004/0041537 A1* | 3/2004 | Ishida et al. | 320/107 |
| 2006/0015683 A1 | 1/2006 | Ashmore et al. | |
| 2006/0080515 A1 | 4/2006 | Spiers et al. | |
| 2007/0015336 A1 | 1/2007 | Farahmandi et al. | |
| 2007/0033433 A1 | 2/2007 | Pecone et al. | |
| 2007/0059602 A1* | 3/2007 | Morishima et al. | 429/231.5 |
| 2009/0211352 A1* | 8/2009 | Hatanaka et al. | 73/146 |
| 2009/0319720 A1 | 12/2009 | Stefanus et al. | |
| 2010/0112454 A1* | 5/2010 | Visco et al. | 429/246 |

* cited by examiner

*Primary Examiner* — Arun Williams
(74) *Attorney, Agent, or Firm* — Mitchell K. McCarthy; McCarthy Law Group

(57) ABSTRACT

A capacitor device and associated method having a housing made of a material that is folded to form a cavity sized to contain an electrolyte and electrode package. The material has a substrate and a film attached to the substrate. Respective portions of the film that are folded against each other are fused together to form a first seal that in cooperation with a folded edge of the material seals the cavity. The capacitor also has a second seal attached to the housing and to the first seal that seals the cavity.

20 Claims, 6 Drawing Sheets

RELIABLE EXTENDED USE OF A CAPACITOR FOR BACKUP POWER

SUMMARY

In some embodiments a capacitor is provided having a housing made of a material that is folded along a folded edge onto itself to form a cavity sized to contain an electrolyte and electrode package. The material has a substrate and a film attached to the substrate. Respective portions of the film that are folded against each other are fused together to form a first seal that in cooperation with the folded edge of the material seals the cavity. The capacitor also has a second seal attached to the housing and to the first seal that seals the cavity.

In some embodiments a method is provided for supplying backup power to a device. The method includes electrically connecting a capacitor to a circuit board portion of the device, the capacitor having a housing comprising a material that is folded along a folded edge onto itself to form a cavity sized to contain an electrolyte and electrode package, the material having a substrate and a film attached to the substrate, respective portions of the film that are folded against each other being fused together to form a first seal that in cooperation with the folded edge of the material seals the cavity, and the capacitor having a second seal attached to the housing and to the first seal that seals the cavity. The method further includes electrically charging the capacitor, and then electrically discharging the capacitor to power the device.

In some embodiments a circuit is provided having a capacitor providing a backup power supply, and means for sealing an electrolyte and electrode package of the capacitor with serially accumulative seals to provide an extended operable life of the electrolyte and electrode package in a harsh working environment of high operating temperature.

DESCRIPTION

A steadily increasing number of electronic devices employ processing capabilities utilizing volatile memory that must be continually powered. Backup power accommodations must be provided in the event of a disruption of the primary power supply. Some types of such devices have an operably spinning motor that can be used to generate back electromotive energy to power a processor long enough to durably store data in the non-volatile memory before shutting down the device. Where no such dynamic energy source is available, a battery is a widely used solution for backup power. In some circumstances it can be more advantageous to use a large capacitor, sometimes called a supercapacitor, instead of a battery to provide the backup power.

The useful life of a capacitor is related to the prolonged operating temperature and charge value it is subjected to. Many operating environments, such as enterprise storage systems, continuously subject the capacitor to a full charge state at elevated temperatures. Those harsh environmental conditions typically create electrolyte permeation from the capacitor package, inducing a failure mode by way of an increase in equivalent serial resistance and a concurrent reduction in capacitance. The embodiments of the present invention are directed to an improved capacitor construction and associated usage that controls electrolyte permeation to the extent that the capacitor can be reliably used in the harsh environment for the expected life of the device it supplies backup power to.

Figure 1:
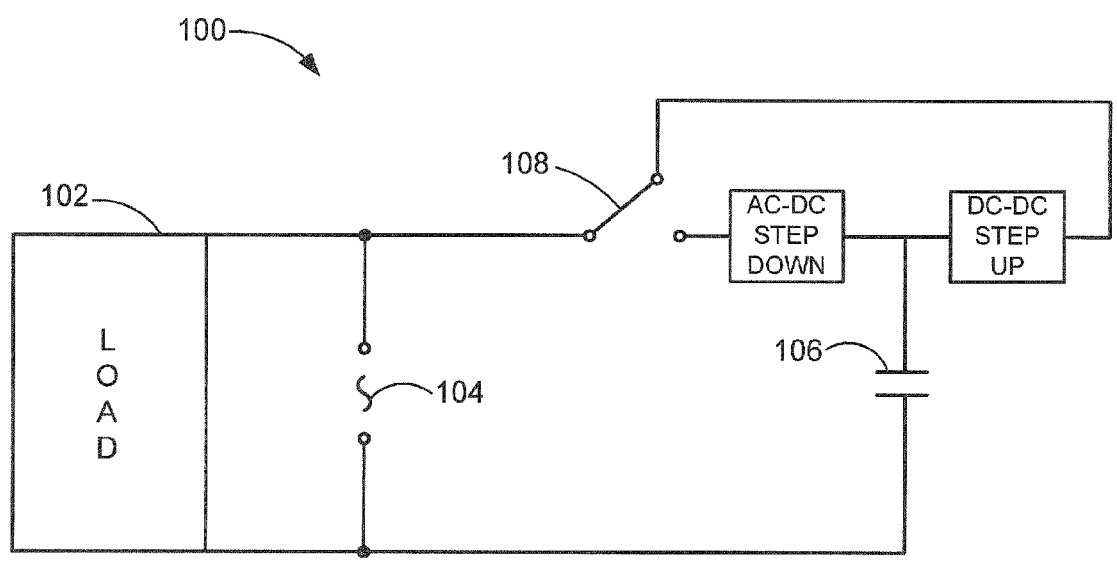
FIG. 1 is a simplified schematic of a power circuit constructed in accordance with embodiments of the present invention.

FIG. 1 is a simplified schematic depiction of a power circuit 100 selectively providing primary or backup power to a load 102. Primary power in these illustrative embodiments is provided by an alternating current power source 104. In alternative equivalent embodiments a battery power source can be provided in addition to or instead of the alternating current power source 104. A backup power source is provided in parallel to the primary power source, in these embodiments advantageously in the form of a capacitor 106. A switch 108 is selectively positioned between a first position (not shown) whereby power from the primary power source charges the capacitor 106 and a second position shown whereby the capacitor 106 is discharged to power the load 102.

In some embodiments the load 102 is a solid state drive (SSD) storage device and the capacitor 106 is a backup power source contained on the SSD's printed circuit board assembly (PCBA). In those embodiments the capacitor 106 provides adequate backup power to reliably store data from a volatile memory, such as from SDRAM cache, to a non-volatile memory, such as NAND flash memory. Also, the completion of a buffered write to NAND Flash memory can take longer than the time required to transfer the data to the SSD. Backup power is needed to ensure that data still in the controller's volatile memory buffer, often FRAM, has time to be placed to a non-volatile memory, such as NAND flash memory. An illustrative capacitor 106 that is well suited for use in these applications is capable of providing a capacitance of two 180 mF super caps in series, in order to deliver a threshold voltage for a sufficiently long time to flush the cache.

Figure 2:
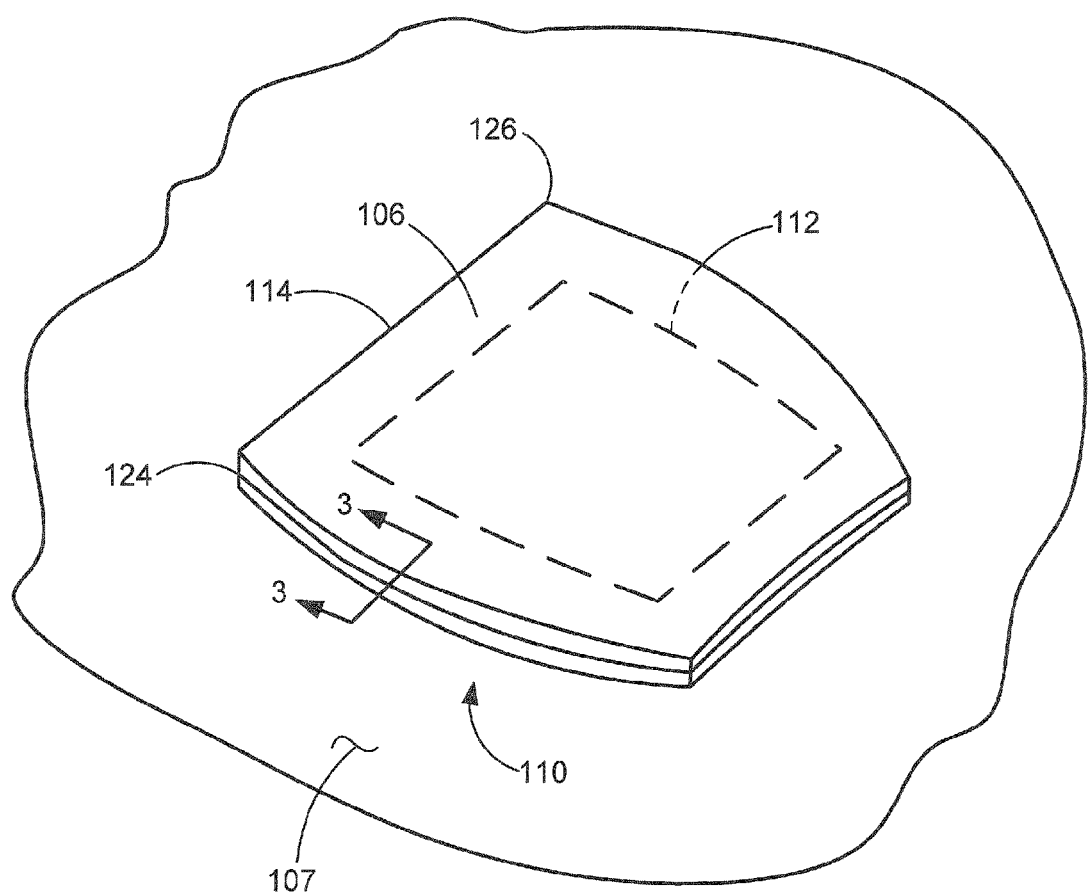
FIG. 2 is an isometric depiction of the capacitor in the power circuit of FIG. 1.
Figure 3:
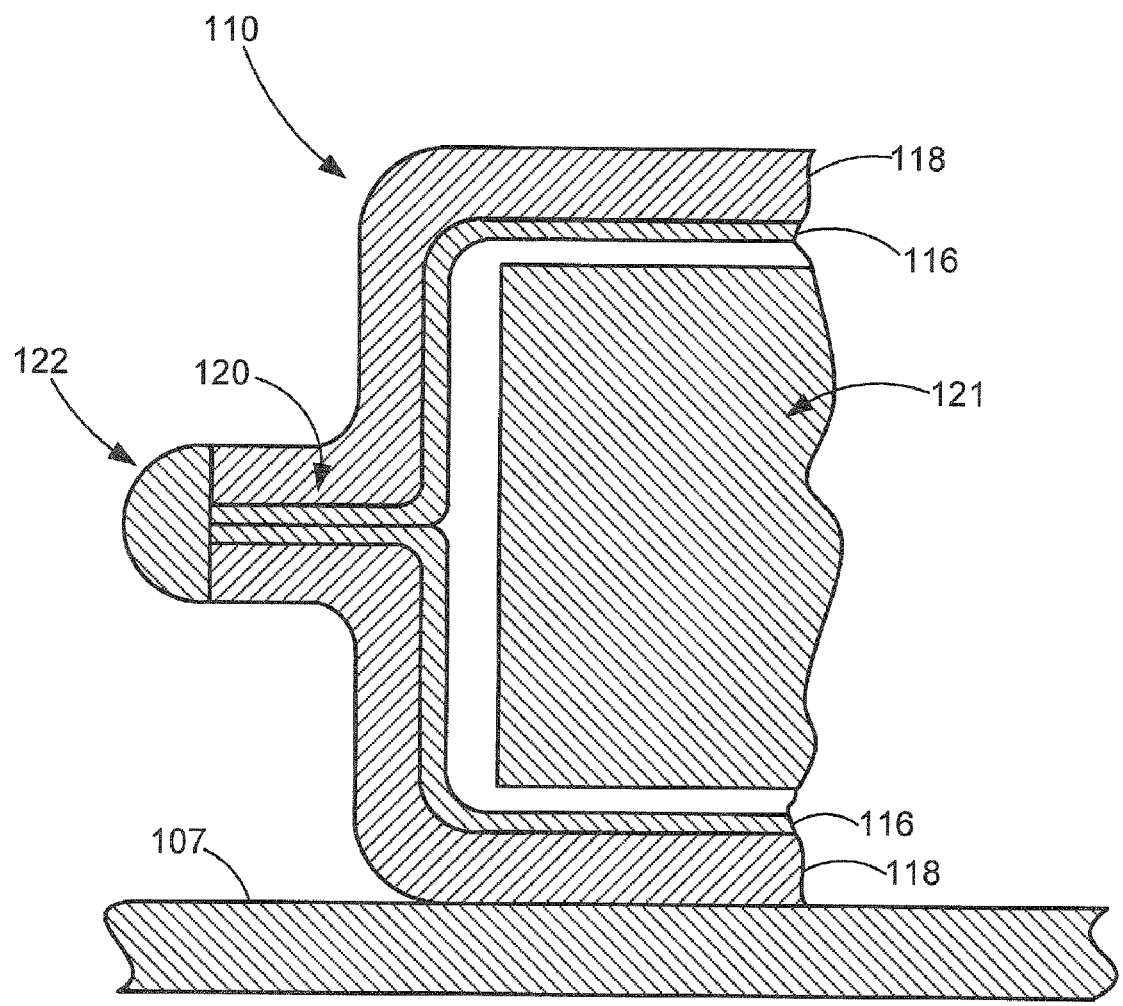
FIG. 3 is a cross sectional depiction of a portion of the capacitor of FIG. 2.

FIG. 2 is an isometric depiction of the capacitor 106 operably surface mounted to the PCBA 107. The capacitor 106 is formed of a flexible material, such as an aluminum foil material, that is folded over along a folded edge 114 onto itself to form a housing 110 defining an internal cavity 112 that contains an electrolyte and electrode package 121 (FIG. 3). The cavity 112 is thereby sealed on one side by the folded edge 114. The other three sides are sealed together to complete the sealing of the cavity 112.

Generally, a sealing material is provided to seal the portions of the housing 110 where the material is folded against itself. Preferably, the material is constructed of a substrate, such as the aluminum foil material, and a film attached to the substrate. The film is provided to affect the seal. The film can be provided in the form of an epoxy material, a thermoset material, a thermoplastic material, and the like. In this manner, the cross-section view of FIG. 3 depicts how respective portions of the film 116, attached to the substrate 118, that are folded against each other can be fused together, such as by the application of pressure and/or heat, to form a seal 120. The peripheral seal 120 in cooperation with the folded edge 114 seals the cavity 112 containing the electrolyte and electrode package 121.

Added to the seal 120, an additional serial seal 122 is attached to the housing 110 and the seal 120. The seals are referred to as being "serial" because either the first seal 120 or the second seal 122 would, individually and in and of itself, seal the cavity 112 with certain veracity, but not adequately to provide the expected useful life of the SSD in these illustrative embodiments. The second seal 122 is effectively serial to the first seal 120 because it seals against the rate at which the electrolyte permeates the first seal 120. The serial seals 120, 122 cooperatively control the electrolyte permeation from the cavity 112 to a rate that provides the expected reliability over the expected life of the SSD in these illustrative embodiments.

The second seal 122 can be an epoxy adhesive. Successful trials with such a material were conducted using an epoxy adhesive marketed by Bacon Industries as product number LCA-4, and alternatively using another epoxy adhesive marketed by 3M as product number DP460 EG. In alternative equivalent embodiments the second seal 122 can be formed of a hot melt adhesive, a thermoset adhesive, a thermoplastic adhesive, and the like. In yet other alternative equivalent embodiments the second seal 122 can be constructed of a combination of epoxy or hot melt, and the like, adhering a foil covering to the protuberant flanges forming the seal 120. The foil member is formed in a "U" shape where it covers the protuberant flanges and is adhered to the housing 110.

In the illustrative embodiments of FIG. 3 the seal 122 spans the seam formed at the joint where the respective portions of the films 116 are folded against each other and fused together. To maximize the effectiveness of the serial dual seals, the second seal 122 is applied continuously along the seam on all three sides, from one end 124 (FIG. 2) of the folded side 114 to the other end 126 of the folded side 114. In these illustrative embodiments the seal 122 can be applied either before or after the capacitor 106 is attached to the PCBA 107.

Figure 4:
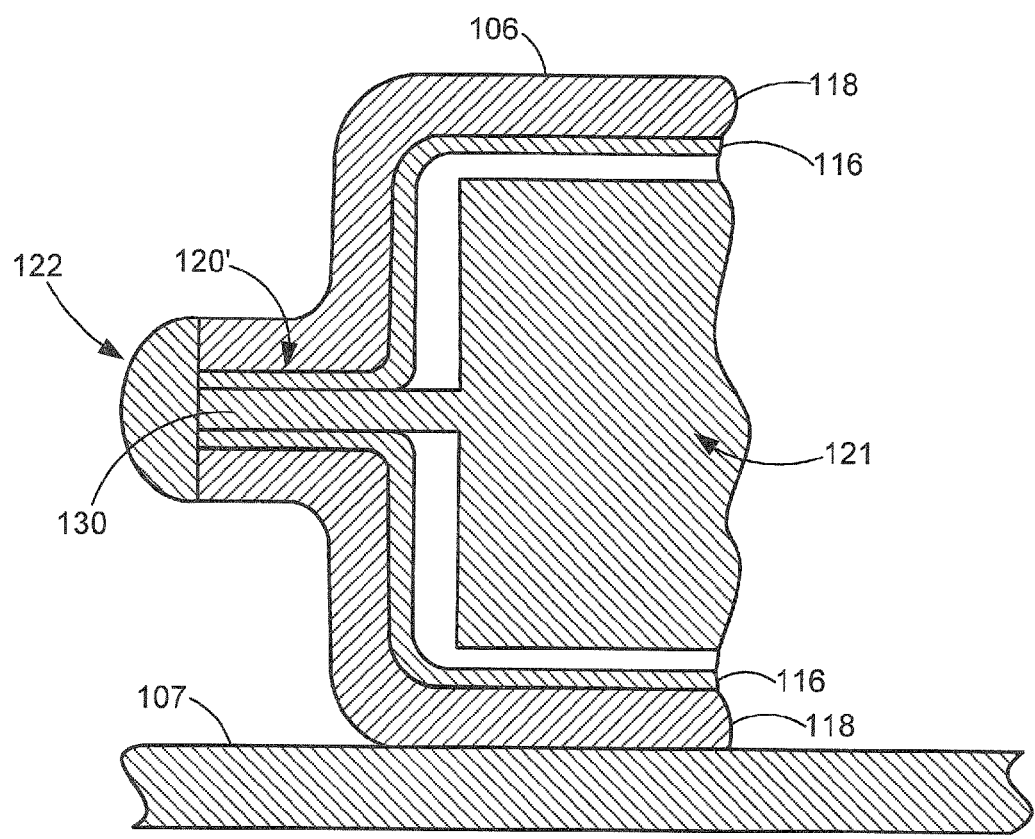
FIG. 4 is a cross sectional depiction of another portion of the capacitor of FIG. 2.

FIG. 4 depicts a cross sectional view similar to that of FIG. 3 but at a location where an electrical contact member 130 extends from the electrolyte and electrode package 121 to electrically connect to the PCBA 107 at a distal end thereof. In this case the films 116 are fused to opposing surfaces of the contact 130 to form the first seal 120'. The second seal 122 is applied in the previously described manner to the housing 110 and to the first seal 120'.

Figure 5:
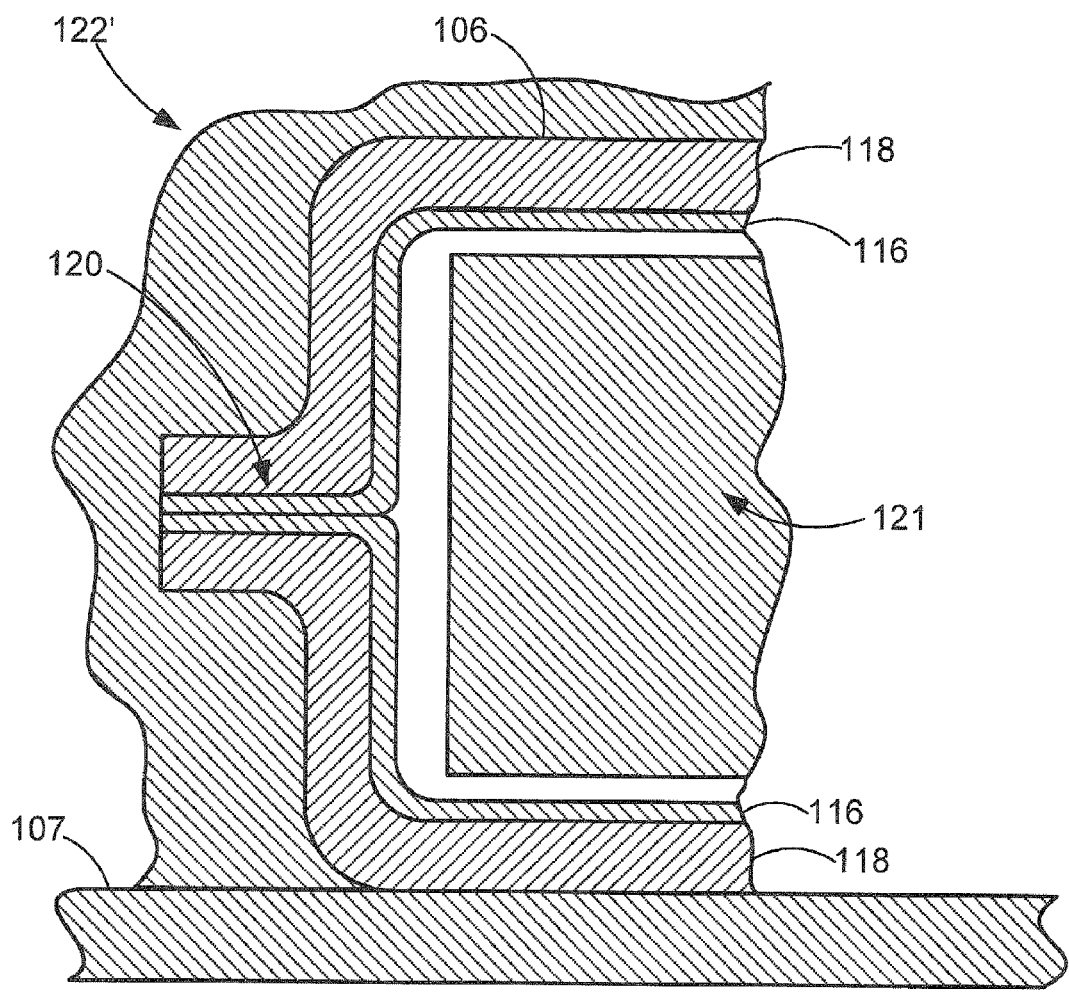
FIG. 5 is a cross sectional depiction of an alternative construction of the capacitor in the power circuit of FIG. 1.

The serial dual seal construction embodiments of FIGS. 3 and 4 have been demonstrated to control the rate of electrolyte permeation through the fused seam to a level at or below an acceptable rate that provides the expected capacitor 106 performance in the harsh environment of the illustrative embodiments. However, it has been determined that in some circumstances, to a lesser extent, an unacceptable electrolyte permeation rate can occur through material voids present in the housing 110; that is, voids through the film 116 and substrate 118. To assuredly guard against such an occurrence, FIG. 5 depicts alternative embodiments of the present invention in which the second seal 122' is further attached to the PCBA 107 to entirely envelop the capacitor 106 opposite the PCBA 107. The second seal 122' can be applied after the capacitor 106 is electrically connected to the PCBA 107. Alternatively, the seal 122' can be partially formed by setting the capacitor 106 onto a bed of the epoxy adhesive to electrically connect it to the PCBA 107, and then applying the rest of the seal 122' on top of the bed and capacitor 107.

Figure 6:
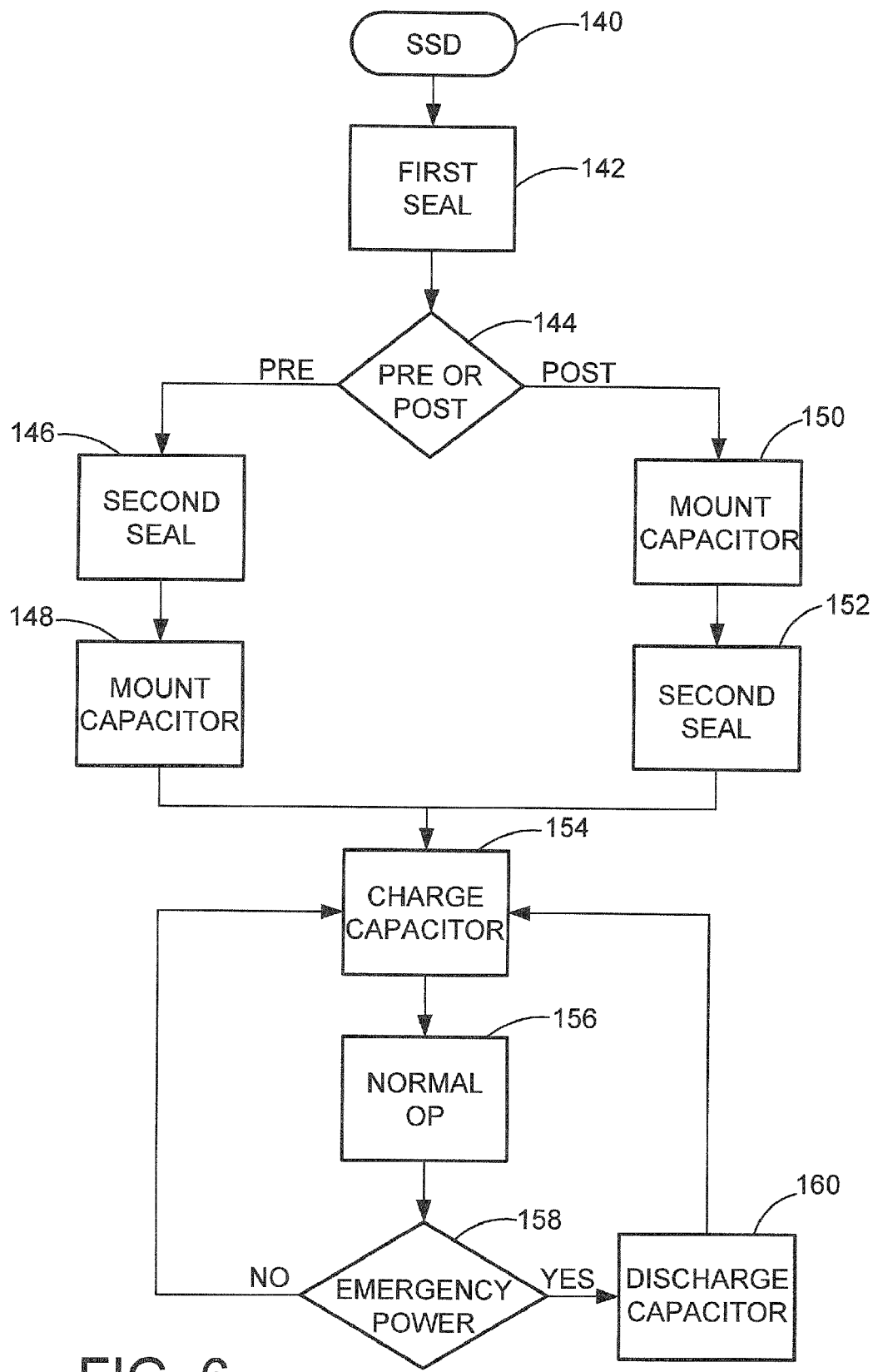
FIG. 6 is a flowchart depicting steps in a method for using the capacitor in the power circuit of FIG. 1 for backup power.

FIG. 6 depicts steps in a method 140 for producing the SSD of the illustrative embodiments with emergency backup power. Preferably, the steps describe computer instructions that are stored in a memory and executed to practice the present embodiments.

The method 140 begins in block 142 by obtaining a capacitor housing with folded, formed, and then fused seamed edges that form the first seal. In block 144 it is determined whether the second seal is to be pre-applied or post-applied. If the determination of block 144 is to pre-apply the second seal, then in block 146 the second seal is then applied to the capacitor such as in FIGS. 3 and 4. Control then passes to block 148 where the capacitor is electrically attached to the PCBA. Contrarily, if the determination of block 144 is to post-apply the second seal, then in block 150 the capacitor is electrically connected to the PCBA. Control then passes to block 152 where the second seal is applied to the capacitor, such as in the embodiments of FIG. 5.

In either event, control then passes to block 154 where the power circuit operationally charges the capacitor 106 and normal SSD operations ensue in block 156. A determination is made in block 158 as to whether a call is made for emergency power. If the determination of block 158 is yes, then the power circuit discharges the capacitor in block 160, subsequently sending control back to block 154. If the determination of block 158 is no, then operational control passes to block 154.

Generally, a circuit is disclosed employing a capacitor for providing a backup power supply, and further employing means for sealing an electrolyte and electrode package of the capacitor with serially accumulative seals to provide an extended operable life of the electrolyte and electrode package in the harsh working environment of high operating temperature and high voltage described above. For purposes of this description and meaning of the appended claims, "means for sealing" encompasses the disclosed structure and equivalent structures that redundantly seal the cavity in the housing containing the electrolyte and electrode package. That is, as described above, the first seal and the second seal individually in and of themselves seal the cavity, but with less veracity than the accumulated effect of both serial seals. It is the accumulated veracity of the serial seals that provides the expected capacitor performance.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed is:

1. A capacitor comprising:
   a housing comprising a material that is folded to form a cavity sized to contain an electrolyte and electrode package, the material having a substrate and a film attached to the substrate, respective portions of the film that are folded against each other being fused together to form a first seal that in cooperation with a folded edge of the material seals the cavity; and
   a second seal attached to the housing and to the first seal that seals the cavity.

2. The capacitor of claim 1 wherein the substrate comprises a metal.

3. The capacitor of claim 1 wherein the film comprises an epoxy material.

4. The capacitor of claim 1 wherein the film comprises a thermoset material.

5. The capacitor of claim 1 wherein the film comprises a thermoplastic material.

6. The capacitor of claim 1 wherein the second seal comprises an epoxy adhesive.

7. The capacitor of claim 1 wherein the second seal comprises a hot melt adhesive.

8. The capacitor of claim 1 wherein the second seal comprises a thermoset adhesive.

9. The capacitor of claim 1 wherein the second seal comprises a thermoplastic adhesive.

10. The capacitor of claim 1 wherein the second seal spans a seam formed at a joint where the respective portions of the films are folded against each other.

11. The capacitor of claim 10 wherein the second seal extends continuously along the seam from one end of the folded edge to the other end of the folded edge.

12. The capacitor of claim 1 wherein the capacitor is operably supported on a circuit board, and wherein the second seal is further attached to the circuit board to entirely envelop the capacitor opposite the circuit board.

13. The capacitor of claim 1 wherein a contact extends from the electrolyte and electrode package passing between the portions of the films that are folded against each other, one of the films being fused to one side of the contact and the other of the films being fused to the opposing side of the contact, and the second seal further attached to the contact.

14. A method of supplying backup power to a device, comprising:
   electrically connecting a capacitor to a circuit board portion of the device, the capacitor having a housing comprising a material that is folded to form a cavity sized to contain an electrolyte and electrode package, the material having a substrate and a film attached to the substrate, respective portions of the film that are folded against each other being fused together to form a first seal that in cooperation with a folded edge of the material seals the cavity, and the capacitor having a second seal attached to the housing and to the first seal that seals the cavity;
   electrically charging the capacitor; and
   electrically discharging the capacitor to power the device.

15. The method of claim 14 wherein the electrically connecting step is characterized by attaching the second seal to the capacitor before the electrically connecting the capacitor to the circuit board step.

16. The method of claim 14 wherein the electrically connecting step is characterized by attaching the second seal to the capacitor after the electrically connecting the capacitor to the circuit board step.

17. The method of claim 14 wherein the electrically connecting step is characterized by the second seal being an adhesive and applying the second seal to a seam formed at the joint where the portions of the film are folded against each other.

18. The method of claim 17 wherein the electrically connecting step is characterized by applying the second seal continuously along the seam from one end of the folded edge to the other end of the folded edge.

19. The method of claim 16 wherein the electrically connecting step is characterized by the second seal being an adhesive applied to the circuit board to entirely envelop the housing opposite the circuit board.

20. A circuit comprising:
   a capacitor providing a backup power supply; and
   means for sealing an electrolyte and electrode package of the capacitor with serially accumulative seals to provide an extended operable life of the electrolyte and electrode package in a harsh working environment of high operating temperature.

* * * * *